United States Patent
Karube et al.

(10) Patent No.: US 9,616,844 B2
(45) Date of Patent: Apr. 11, 2017

(54) VEHICLE SEAT BELT ASSEMBLY

(71) Applicant: HONDA MOTOR CO., LTD., Tokyo (JP)

(72) Inventors: Shinichi Karube, Florence, SC (US); Takeshi Kamiyama, Yoshikawa (JP); Makoto Hotozuka, Kawagoe (JP)

(73) Assignee: Honda Motor Co., Ltd., Tokyo (JP)

( * ) Notice: Subject to any disclaimer, the term of this patent is extended or adjusted under 35 U.S.C. 154(b) by 10 days.

(21) Appl. No.: 14/854,356

(22) Filed: Sep. 15, 2015

(65) Prior Publication Data

US 2016/0090062 A1    Mar. 31, 2016

(30) Foreign Application Priority Data

Sep. 30, 2014  (JP) ................. 2014-201492

(51) Int. Cl.
  *B60R 22/18*    (2006.01)
  *B60R 22/24*    (2006.01)
  *B60R 22/26*    (2006.01)

(52) U.S. Cl.
  CPC .............. *B60R 22/24* (2013.01); *B60R 22/26* (2013.01); *B60R 2022/1818* (2013.01)

(58) Field of Classification Search
  CPC .. B60R 22/24; B60R 2022/1818; B60R 22/26
  USPC ....................................................... 280/808
  See application file for complete search history.

(56) References Cited

U.S. PATENT DOCUMENTS

| | | | | |
|---|---|---|---|---|
| 4,572,543 A | * | 2/1986 | Tsuge | B60R 22/24 280/807 |
| 5,139,282 A | * | 8/1992 | Mein | B60R 22/19 242/377 |
| 6,527,298 B2 | * | 3/2003 | Kopetzky | B60R 22/1958 280/806 |
| 7,664,585 B2 | * | 2/2010 | Odate | B60R 22/44 180/168 |
| 7,887,094 B2 | * | 2/2011 | Sakaida | B60N 2/4808 280/803 |
| 8,348,322 B2 | | 1/2013 | King | |
| 8,876,162 B2 | * | 11/2014 | Shinbori | B60R 22/023 280/756 |
| 8,998,283 B1 | * | 4/2015 | Yamamoto | B60N 2/24 280/756 |
| 9,475,413 B2 | * | 10/2016 | Hayashi | B60R 22/18 |
| 2002/0096872 A1 | * | 7/2002 | Herrmann | B60R 22/28 280/805 |

(Continued)

*Primary Examiner* — Ruth Ilan
(74) *Attorney, Agent, or Firm* — Honda Patents & Technologies North America, LLC; Clifford B Vaterlaus (57) ABSTRACT

A seat belt assembly for a vehicle may be arranged to facilitate installation of a seat belt while improving the operation and feel during use. The vehicle may have a pair of left and right occupant seats on a vehicle body frame. A pair of left and right standing frames may be disposed on the outside of the seats, and the upper end parts of the pair of standing frames may be connected by a cross frame. A winding device of the belt may be supported on the frame so as to be positioned in back of the seat. A through-anchor into which the belt may be inserted may be supported on the upper part of the standing frame. Guide ribs may be provided on a back surface of the seat between the winding device and the through-anchor so as to guide the movement of the belt.

20 Claims, 11 Drawing Sheets

(56) References Cited

U.S. PATENT DOCUMENTS

| | | | | |
|---|---|---|---|---|
| 2005/0206198 A1* | 9/2005 | Kajiwara | ............... | B60R 13/025 296/191 |
| 2009/0184531 A1* | 7/2009 | Yamamura | ............ | B60N 2/3011 296/37.6 |
| 2015/0274121 A1* | 10/2015 | Kuroda | ................. | B60R 22/023 297/391 |
| 2015/0367813 A1* | 12/2015 | Ballarin | .................... | B60N 2/50 280/805 |

* cited by examiner

VEHICLE SEAT BELT ASSEMBLY

CROSS REFERENCES TO RELATED APPLICATIONS

The present application claims priority under 35 U.S.C. §119 to Japanese Patent Application No. 2014-201492, filed Sep. 30, 2014, entitled "Seat Belt Device for Vehicle," the contents of which are incorporated herein by reference in their entirety.

TECHNICAL FIELD

The present disclosure relates generally to seat belt assemblies for vehicles. More particularly, the present disclosure relates to an improvement in seat belt assemblies for use in vehicles, such as a vehicle in which a pair of left and right occupant seats having seat portions and backrests may be provided on a vehicle body frame so that one of the occupant seats is used as a driver's seat and the other is used as a passenger seat. A pair of left and right standing frames constituting a part of the vehicle body frame and extending upward and downward may be disposed on the outside of the pair of occupant seats in the vehicle width direction. The space between the upper ends of the pair of standing frames may be connected by a cross frame constituting a part of the vehicle body frame.

BACKGROUND

A configuration in which a belt winding device is provided on a side panel disposed on the front part of a cargo bed behind the pair of left and right occupant seats in a vehicle is known. However, there are cases in which the side panel is not positioned behind the occupant seats, and in such cases it may be difficult to install the seat belt device. In addition, with the configuration disclosed in the known arrangements, it may be necessary to operate the belt so as to fasten the belt around an occupant seated in an occupant seat after the belt has been pulled out upward from an outlet provided on the upper part of the side panel at a position lower than the upper end of the backrest part of the occupant seat. This arrangement may not operate well and may not have a good feel in use, since the belt may be directly fastened so that a load acts on the shoulder area of the occupant from above.

SUMMARY

The present disclosure was conceived in light of the circumstances described above, and one feature of the present disclosure is to provide a seat belt assembly for a vehicle which can be installed while improving operation and feel of the seat belt in use.

In order to achieve some of the features described above, a first aspect of the present disclosure is applicable in a vehicle in which a pair of left and right occupant seats having seat portions and backrests are provided on a vehicle body frame so that one of the occupant seats is used as a driver's seat and the other is used as a passenger seat. A pair of left and right standing frames constituting a part of the vehicle body frame and extending upward and downward may be disposed on the outside of the pair of occupant seats in the vehicle width direction. The space between the upper ends of the pair of standing frames may be connected by a cross frame constituting a part of the vehicle body frame. Winding devices of belts for restraining people sitting in the occupant seats may be supported on the vehicle body frame so as to be positioned behind the seat portions of the occupant seats and on the outside in the vehicle width direction. Through-anchors positioned above the backrests of the occupant seats may be supported on the upper parts of the standing frames so that the belts may be inserted therethrough. Guide ribs may be provided on the back surfaces of the backrests between the winding devices and the through-anchors so as to guide the movement of the belts while in contact with the belts.

In addition, a second aspect of the present disclosure is that, in addition to the configuration of the first aspect, a plurality of the guide ribs may be provided integrally in a projecting manner on the back surface of a panel made of a resin constituting the back parts of the backrests so as to intersect with the extending direction of the belts with spaces provided therebetween in the extending direction.

A third aspect of the present disclosure is that, in addition to the configuration of the second aspect, the through-anchors may be positioned in front of an extension line extending above the back surfaces of the backrests and above the uppermost parts of the backrests so that straight lines connecting the winding devices and the through-anchors intersect with the backrests from a side perspective.

Further, a fourth aspect of the present disclosure is that, in addition to any of the configurations of the first through third aspects, a headrest for each of the occupant seats may be provided independently from the occupant seats on a headrest attachment member connecting the upper parts of the pair of left and right standing frames, and the through-anchors may be supported on connection parts connecting the upper parts of the standing frames to the headrest attachment member.

According to the first aspect of the present disclosure, the winding devices may be positioned in back of the seat portions of the occupant seats and on the outside in the vehicle width direction, and the through-anchors may be supported so as to be positioned above the backrests on the upper parts of the standing frames constituting a part of the vehicle body frame and extending upward and downward. Therefore, the seat belt devices can be installed regardless of the structure in back of the occupant seats, and an operation for pulling up the belts from behind is unnecessary, as it is only necessary to pull the seat belts downward from above, so the operation can be improved. Moreover, the movement of the belt may be guided by bringing the belt into contact with the guide ribs provided on the back surface of the backrest of the occupant seat, so the movement of the belt is smooth, which makes it possible to reduce the operating load, to reduce the winding force of the winding device, and to enhance the feel of the system in use.

In addition, according to the second aspect of the present disclosure, a plurality of guide ribs with spaces provided therebetween in the extending direction of the belt may be provided integrally in a projecting manner on the back surface of a panel made of resin on the back parts of the backrests so as to intersect with the extending direction of the belts. This makes it possible to increase the ease of assembly and reduce cost when installing the guide ribs, and to make the movement of the belt smooth while reducing the contact area with the belt so as to reduce the operating load.

According to the third aspect of the present disclosure, the through-anchors may be positioned in front of an extension line extending above the back surfaces of the backrests and above the uppermost parts of the backrests so that straight lines connecting the winding devices and the through-anchors intersect with the backrests from a side perspective, so it is possible to further improve operation for occupants in the occupant seats and to prevent slack from occurring in the belts between the through-anchors and the winding devices by reliably bringing the belts into contact with the guide ribs.

Further, according to the fourth aspect of the present disclosure, the through-anchors may be supported on connection parts connecting to the headrest attachment member where headrests may be provided independently from the occupant seats on the upper parts of the standing frames. The operation of the seat belts can therefore be improved by positioning the through-anchors at relatively high positions, and it is possible to reduce the number of parts by eliminating the need to provide specialized frame members for reinforcing the portions supporting the through-anchors.

DETAILED DESCRIPTION

Embodiments of the present disclosure will be described with reference to the attached FIGS. 1 to 12. In the following explanations, the front/rear, left/right, and upward/downward directions refer to directions viewed from an occupant riding in a vehicle.

Figure 1:
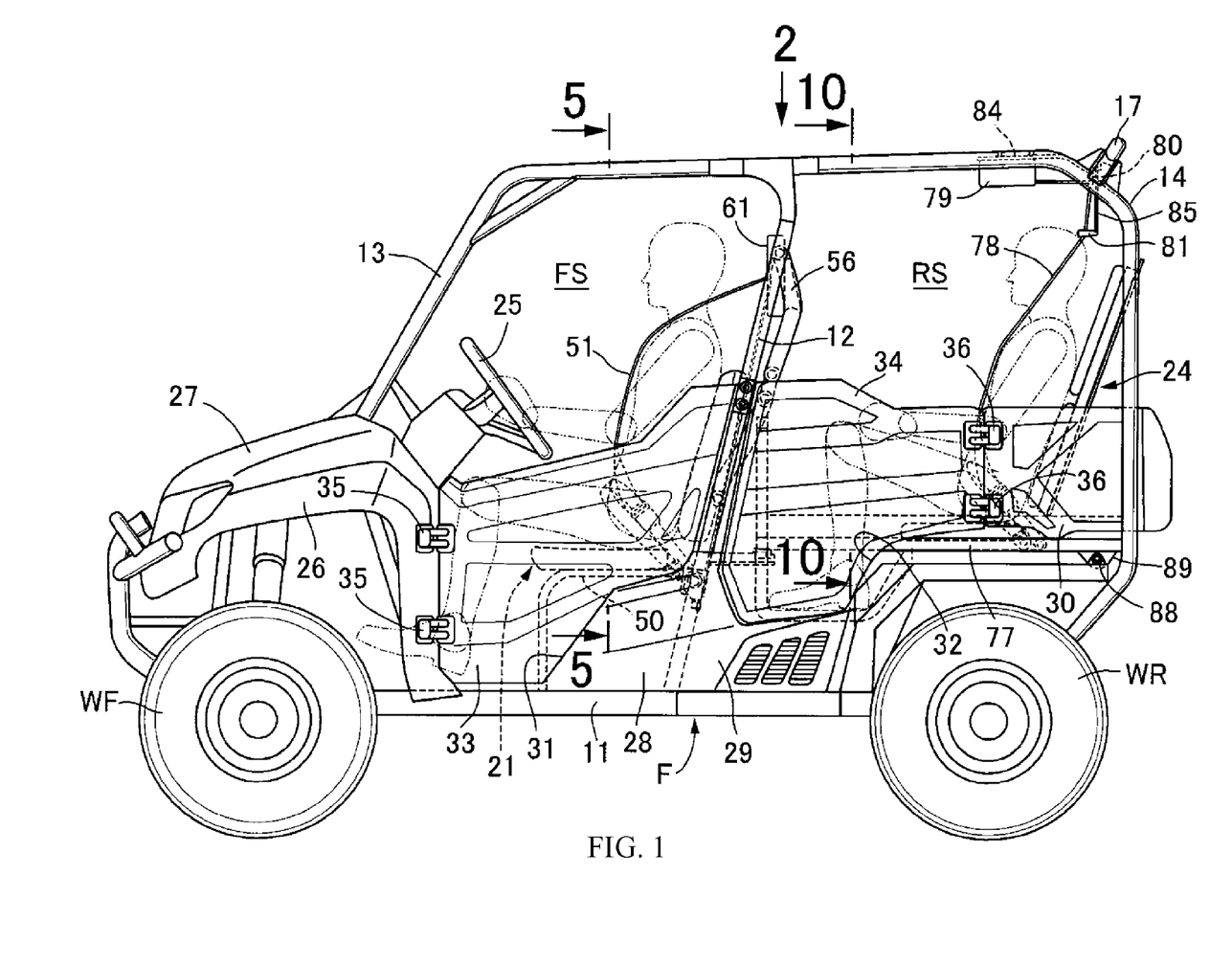
FIG. 1 is a side view of one embodiment of an off-road vehicle in accordance with the principles of the present disclosure.
Figure 2:
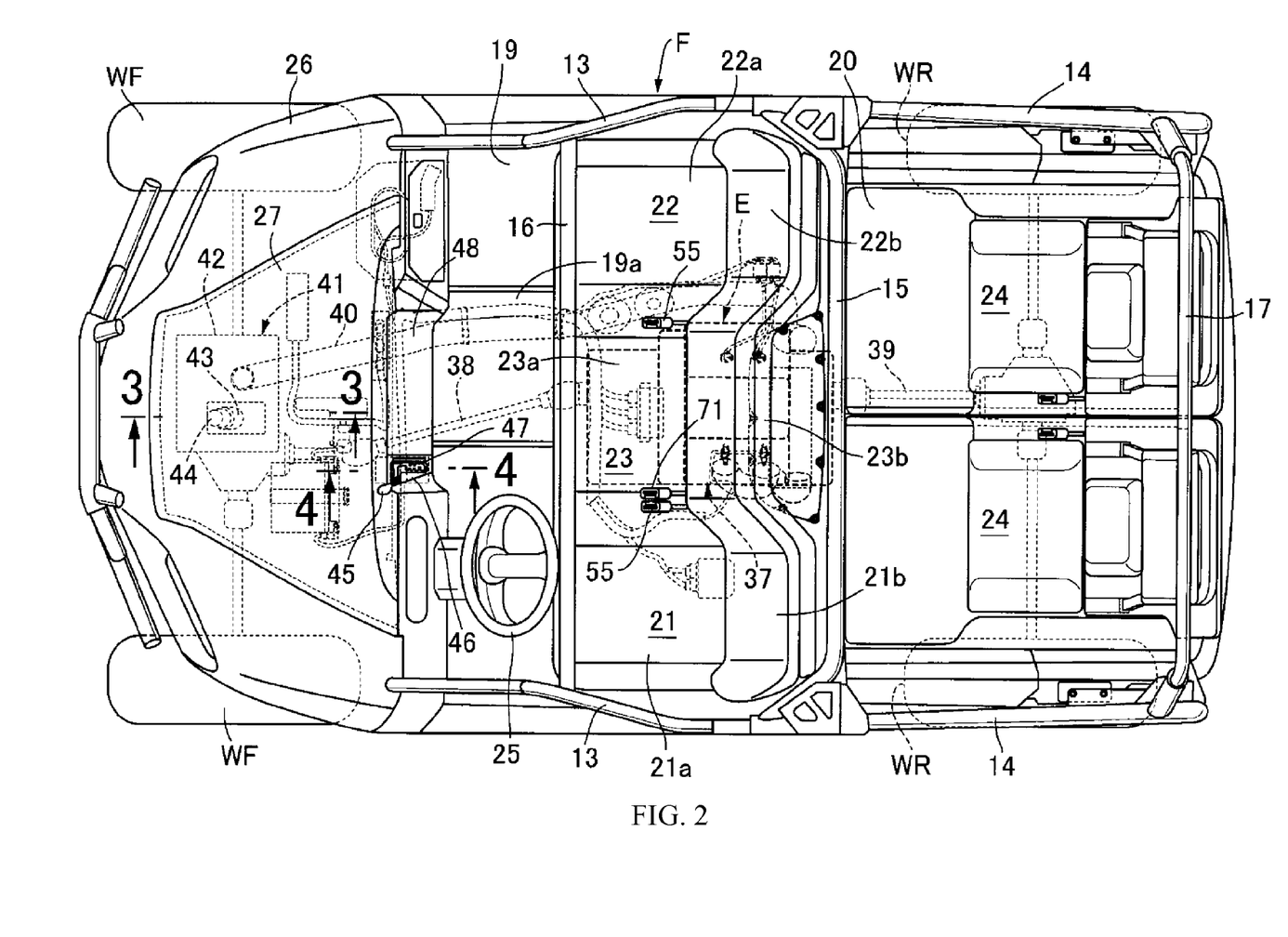
FIG. 2 is a view of the vehicle from the direction of arrow 2 in FIG. 1.

First, in FIGS. 1 and 2, a pair of left and right front wheels WF are suspended on the front part of a vehicle body frame F of a four-wheel-drive vehicle for traveling off-road, and a pair of left and right rear wheels WR are suspended on the back part of the vehicle body frame F. It will be appreciated that the concepts of the present disclosure may also be applicable to a vehicle that may be a two-wheel-drive vehicle or an on-road vehicle, within the scope of the present disclosure.

The vehicle body frame F may comprise: a pair of left and right lower frames 11 extending in the front/rear direction; a pair of left and right center standing frames 12 rising upward from the intermediate parts in the front/rear direction of the lower frames 11; a pair of left and right front side frames 13 provided as a continuation of the front parts of the lower frames 11 so as to extend forward from the upper ends of the center standing frames 12 and to extend forward and downward from an intermediate point; a pair of left and right rear side frames 14 provided as a continuation of the rear parts of the lower frames 11 so as to extend backward from the upper ends of the center standing frames 12 and to extend downward from an intermediate point; an upper center cross frame 15 for connecting the upper end parts of the pair of left and right center standing frames 12; a front cross frame 16 for connecting the intermediate bent parts of the pair of left and right front side frames 13; and an upper rear cross frame 17 for connecting the intermediate bent parts of the pair of left and right rear side frames 14. It will be understood that the vehicle body frame F may be arranged in various other configurations within the scope of the present disclosure.

The pair of left and right center standing frames 12 and the pair of left and right front side frames 13 may constitute the outer contour of a front boarding space FS for a driver and a passenger, and a front floor 19 disposed in front of the center standing frames 12 may be supported on the front part of the vehicle body frame F so as to enable the driver and passenger to board the vehicle. In addition, the pair of left and right center standing frames 12 and the pair of left and right rear side frames 14 may constitute the outer contour of a rear boarding space RS for rear occupants, and a rear floor 20 disposed behind the center standing frames 12 may be supported on the rear part of the vehicle body frame F so as to enable rear occupants to board the vehicle.

A pair of left and right occupant seats 21 and 22 may be provided in the front boarding space FS for the driver and passenger at a distance from one another in the vehicle width direction on the front floor 19 supported on the front part of the vehicle body frame F so that one of the occupant seats 21 and 22 is used as a driver's seat and the other is used as a passenger seat. In this embodiment, of the occupant seats 21 and 22, the occupant seat 21 on the left side is used as a driver's seat, while the occupant seat 22 on the right side is used as a passenger seat, and a steering wheel 25 is disposed in front of the occupant seat 21 on the left side.

The occupant seats 21 and 22 are respectively provided with seat portions 21a and 22a and backrests 21b and 22b rising upward from the rear parts of the seat portions 21a and 22b. In addition, an auxiliary seat 23 having a backrest 23b displaced further forward than the backrests 21b and 22b of the occupant seats 21 and 22 and a seat portion 23a disposed between the seat portion 21a and 22a of the occupant seats 21 and 22 is provided between the occupant seats 21 and 22. On the other hand, a pair of left and right rear occupant seats 24 are provided in the rear boarding space RS for rear occupants.

A front cover 26 on which a hood 27 is supported so that it can be opened and closed is supported on the front part of the vehicle body frame F so as to cover the pair of left and right front wheels WF from above. In addition, a front side cover 28 for covering the lower part on the rear side of the front boarding space FS from the side, a pair of left and right center side covers 29 for covering the lower parts on the front side of the rear boarding space RS from the sides, and a pair of left and right rear side covers 30 for covering the lower parts on the rear side of the rear boarding space RS from the sides are attached to the vehicle body frame F. Further, a pair of left and right front doors 33 capable of opening and closing front entrances 31 respectively formed between the front side cover 28 and the front cover 26 are respectively supported on the left and right rear parts of the front cover 26 so that the doors can be rotated by a pair of upper and lower hinge parts 35, and rear doors 34 capable of opening and closing rear entrances 32 respectively formed between the center side covers 29 and the rear side covers 30 are respectively supported on the front parts of the rear side covers 30 so that the doors can be rotated by a pair of upper and lower hinge parts 36.

An engine E positioned below the auxiliary seat 23 is supported on the vehicle body frame F. A front wheel drive shaft 38 for driving the pair of left and right front wheels WF is extended forward from an engine main body 37 of the engine E, and a rear wheel drive shaft 39 for driving the pair of left and right rear wheels WR is extended backward from the engine main body 37.

A tunnel part 19a bulging upward is provided on the front floor 19 at a portion corresponding to the auxiliary seat 23 so as to extend in the front/rear direction, and the front wheel drive shaft 38 and an air intake duct 40 for supplying air to the engine main body 37 are housed inside the tunnel part 19a.

Figure 3:
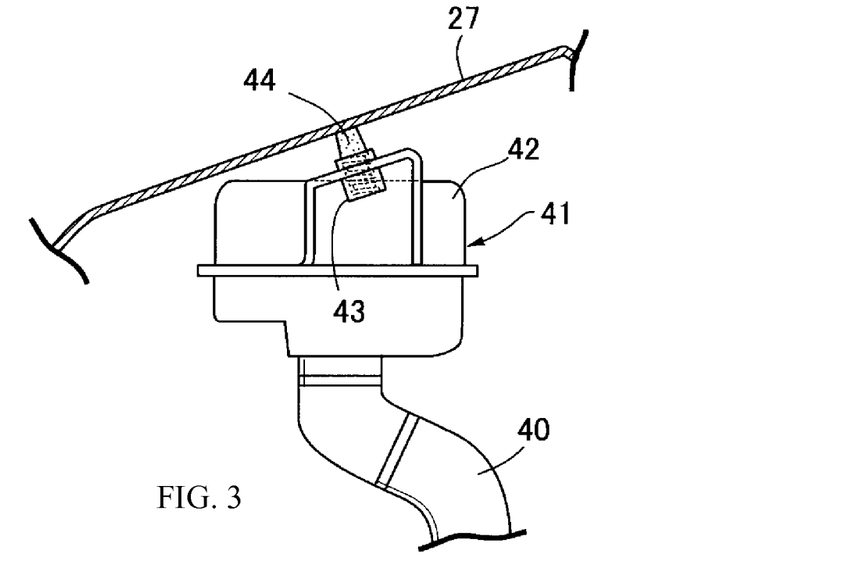
FIG. 3 is a cross-sectional view along line 3-3 in FIG. 2.

Referring also to FIG. 3, an air cleaner 41 of the engine E is disposed below the hood 27, and the front end part of the air intake duct 40 is connected to the lower part of the air cleaner 41.

A boss member 43 with a bottomed tubular shape opening upward is fixed to the upper part of a cleaner case 42 of the air cleaner 41. A receiving member 44 made of an elastic material such as rubber is screwed into the boss member 43 so as to elastically make contact with the lower surface of the central part of the hood 27. This receiving member 44 is threaded so that the advancing and retreating position can be adjusted with respect to the boss 43, and the amount of projection of the receiving member 44 from the upper end of the boss 43 can be adjusted.

By supporting the central part of the hood 27 from below with the receiving member 44 in this way, it is possible to suppress rattling of the hood 27. This makes it possible to reduce the weight of the hood 27 as a resin product.

Focusing on FIG. 2, a shift lever 45 to be operated by an occupant sitting in the occupant seat 21 serving as a driver's seat is positioned on the right side of the steering wheel 25, and a guide plate 46 having a guide hole 47 for guiding the shift operation of the shift lever 45 by the occupant is provided on an instrument panel 48 installed on the front part of the front boarding space FS.

Figure 4:
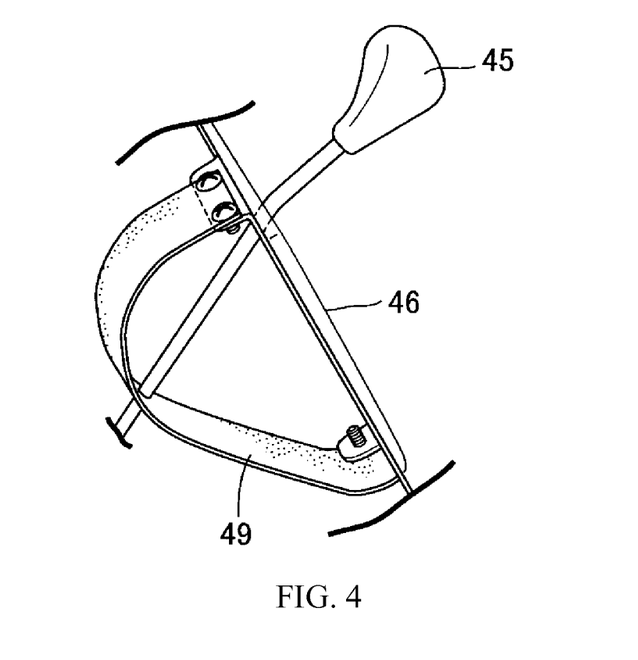
FIG. 4 is a magnified cross-sectional view along line 4-4 in FIG. 2.

In FIG. 4, both ends of a rubber plate 49 for covering the guide hole 47 from the inside of the guide plate 46 are fastened to the guide plate 46, and the shift lever 45 is disposed so as to pass through the rubber plate 49. Accordingly, the rubber plate 49 also bends in accordance with the operation of the shift lever 45, but at this time, the size of the rubber plate 49 is determined so that most of the guide 47 can be covered from the inside of the guide plate 46, regardless of the operation position of the shift lever 45, while avoiding applying substantial resistance to the operation of the shift lever 45.

By providing the rubber plate 49, situations in which the inner portion of the guide plate 46 from the guide hole 47 becomes visible depending on the operation position of the shift lever 45 can be avoided, which yields an improvement in marketability.

Figure 5:
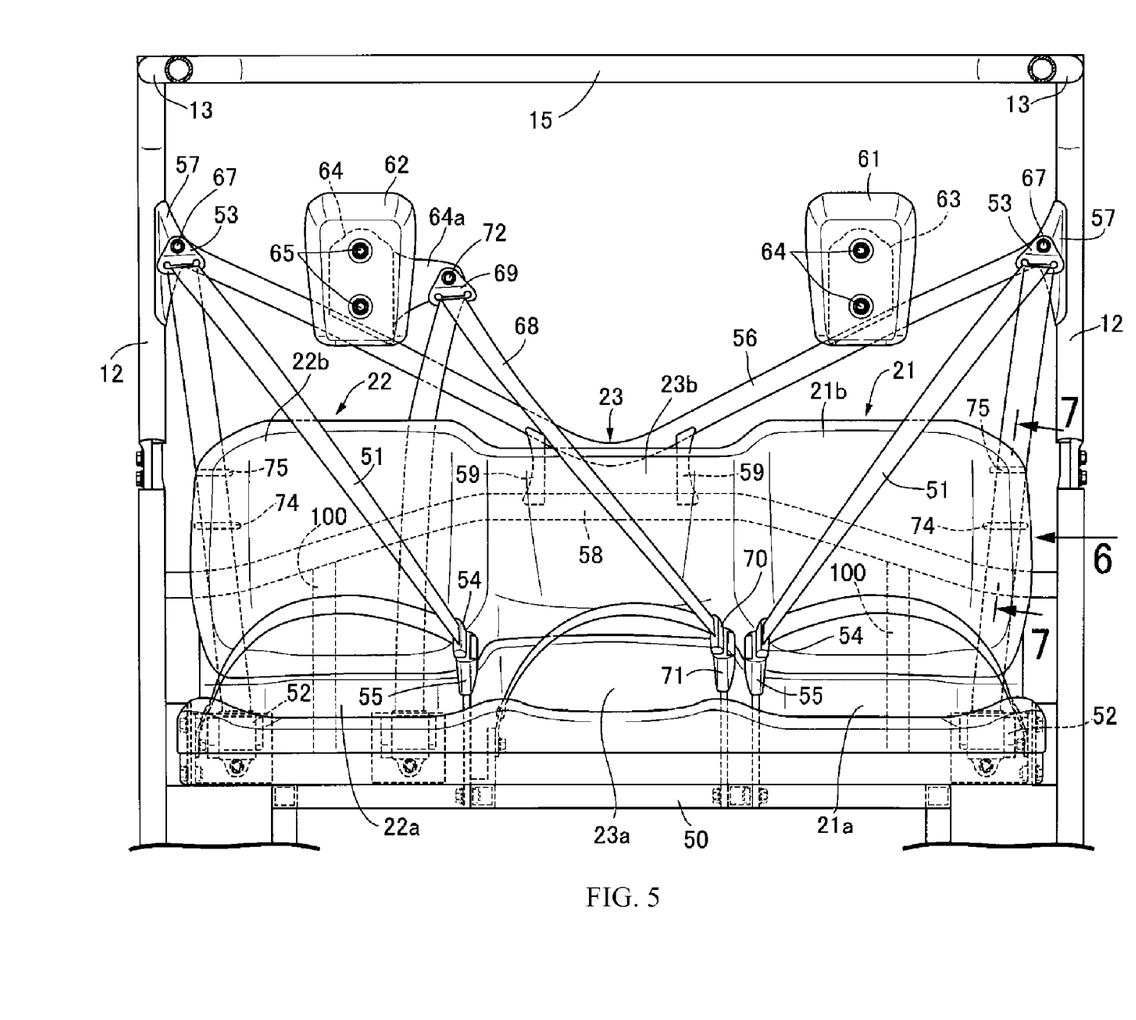
FIG. 5 is a cross-sectional view along line 5-5 in FIG. 1.

Referring also to FIG. 5, the vehicle body frame F has a seat support frame 50 which projects upward from the front floor 19, and the occupant seats 21 and 22 and the auxiliary seat 23 are provided on this seat support frame 50.

Figure 6:
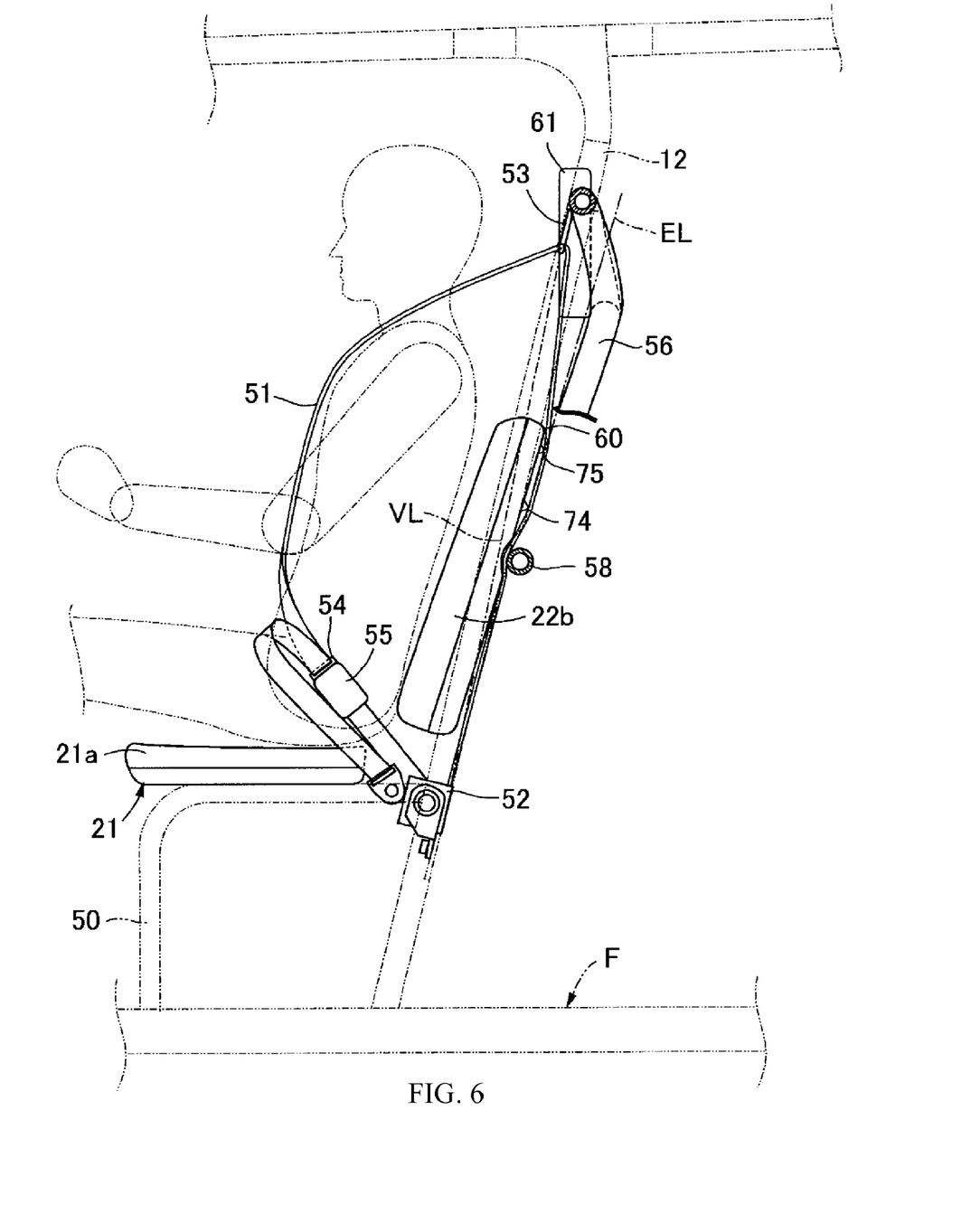
FIG. 6 is a simplified view from the direction of arrow 6 in FIG. 5.

Referring also to FIG. 6, a winding device 52 of a belt 51 for restraining a person sitting in the occupant seat 21 serving as a driver's seat is supported on the seat support frame 50 of the vehicle body frame F so as to be positioned in back of the seat portion 21a of the occupant seat 21 and on the outside in the vehicle width direction. A through-anchor 53 into which the belt 51 is inserted is positioned above the backrest part 21b of the occupant seat 21. The tip of the belt 51 extending from the winding device 52 is fixed to the seat support frame 50 in front of the winding device 52.

The through-anchor 53 is positioned on the left side of the backrest part 21b of the occupant seat 21 and is supported on the upper part of the standing frame 12 extending upward and downward. A buckle 55 which engages in a catchable/releasable manner with a tongue plate 54 into which the belt 51 is inserted is positioned on the right side of the seat portion 21a of the occupant seat 21 and is supported on the seat support frame 50.

For the occupant seat 22 serving as a passenger seat, the belt 51, the winding device 52, the through-anchor 53, the tongue plate 54, and the buckle 55 are positioned with the left and right sides reversed from those of the occupant seat 21 and are simply illustrated in FIG. 5 with the same labels as those used for the occupant seat 21.

A headrest attachment member 56 formed by bending a pipe into a "V" shape so that the portion corresponding to the auxiliary seat 23 between the occupant seats 21 and 22 is lowest is provided in the space between the upper parts of the pair of left and right standing frames 12. Gussets 57 are respectively provided on both ends of this headrest attachment member 56, and the gussets 57 are fixed to the upper part of the standing frames 12.

A lower center cross frame 58 passing behind the backrests 21b, 22b, and 23b of the occupant seats 21 and 22 and the auxiliary seat 23 and spanning the space between the pair of left and right standing frames 12 is disposed below the headrest attachment member 56, and a pair of connection members 59 extending upward and downward are provided in the space between the central parts in the vehicle width direction of the headrest attachment member 56 and the lower center cross frame 58.

A headrest for each of the occupant seats 21 and 22 is provided independently from the occupant seats 21 and 22 on the headrest attachment member 56. That is, a headrest 61 corresponding to the occupant seat 21 is fastened by a pair of upper and lower bolts 64 to a support plate 63 fixed to the headrest attachment member 56 at a part corresponding to the occupant seat 21, and a headrest 62 corresponding to the occupant seat 22 is fastened by a pair of upper and lower bolts 65 to a support plate 64 fixed to the headrest attachment member 56 at a part corresponding to the occupant seat 22. In addition, a support projection 64a projecting inward in the vehicle width direction from the headrest 62 is provided integrally with the support plate 64.

Incidentally, the through-anchors 53 are fastened with connection parts connecting the standing frames 12 to the headrest attachment member 56 and, in this embodiment, are fastened with bolts 67 to the gussets 57.

A winding device (not illustrated) of a belt 68 for restraining a person sitting in the auxiliary seat 23 is supported on the seat support frame 50 of the vehicle body frame F so as to be positioned behind the seat portion 22a of the occupant seat 22, and a through-anchor 69 into which the belt 68 is inserted is supported on the support projection 64a of the support plate 64. The tip of the belt 68 is fixed to the seat support frame 50 between the occupant seat 22 and the auxiliary seat 23. In addition, a buckle 71 which engages in a catchable/releasable manner with a tongue plate 70 into which the belt 68 is inserted is supported on the seat support frame 50 so as to be aligned with the buckle 55 associated with the occupant seat 21.

Figure 7:
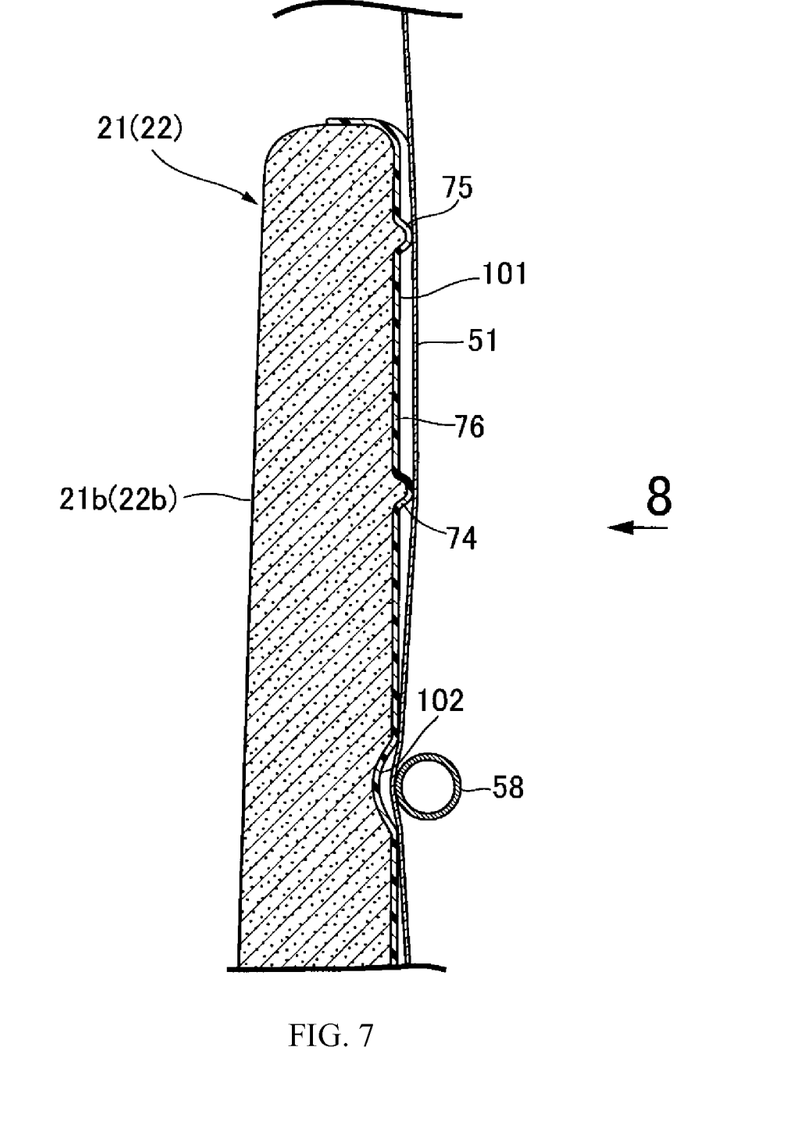
FIG. 7 is a cross-sectional view along line 7-7 in FIG. 5.
Figure 8:
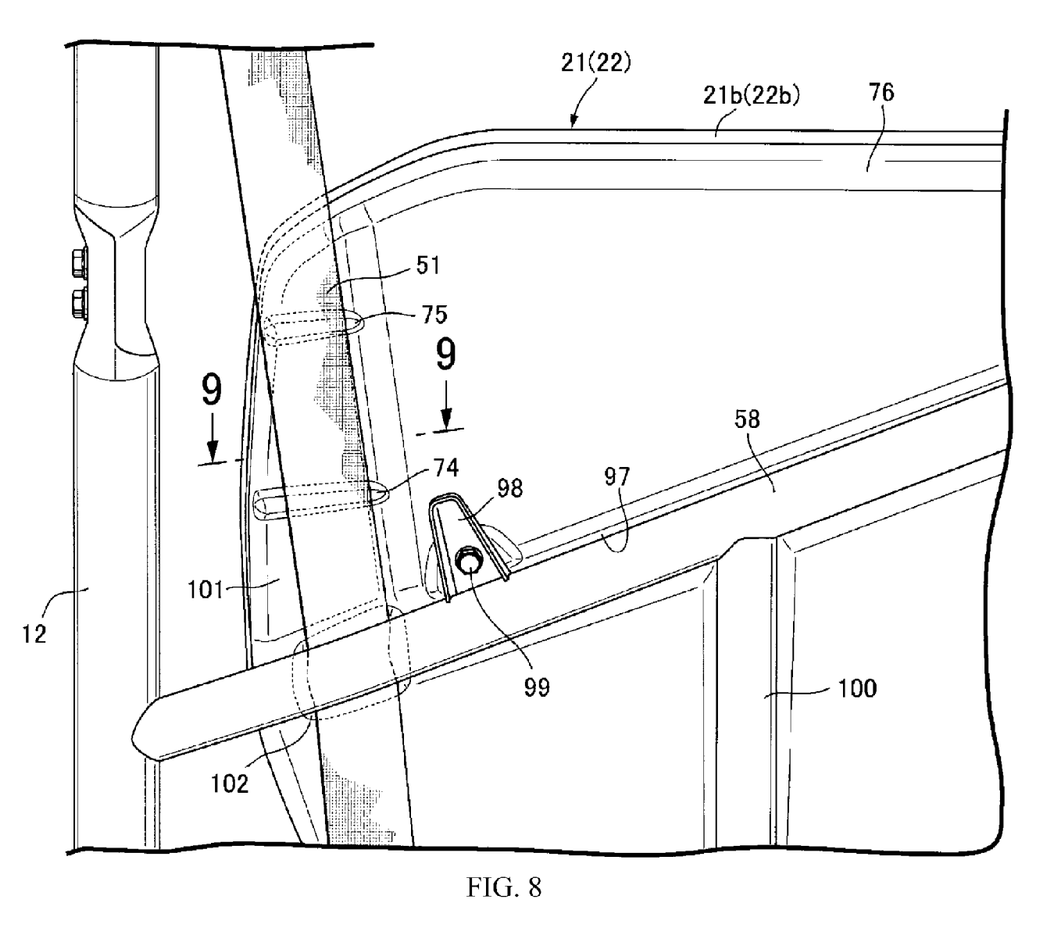
FIG. 8 is a view from arrow 8 in FIG. 7.
Figure 9:
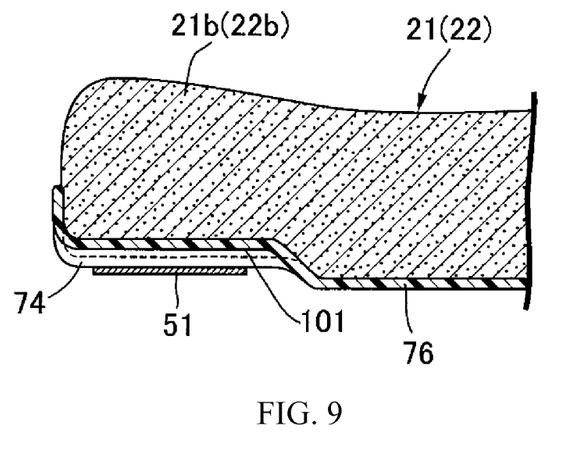
FIG. 9 is a cross-sectional view along line 9-9 in FIG. 8.

Referring also to FIGS. 7 to 9, the back parts of the backrests 21b and 22b of the occupant seat 21 and the back parts of backrest part 23b of the auxiliary seat 23 are configured with a panel 76 common to 21b, 22b, and 23b, and a groove 97 for housing a part of the lower center cross frame 58 is formed in the back surface of the panel 76. Stays 98 fixed to a plurality of spots in the lengthwise direction of the lower center cross frame 58 are fastened to the panel 76 with bolts 99. That is, the panel 76 is supported by the lower center cross frame 58, and the lower center cross frame 58 and the seat support frame 50 are connected by support frames 100 extending upward and downward at two spots with spacing therebetween in the vehicle width direction.

At least one, or a plurality—for example, a pair—of guide ribs 74 and 75 extending between the winding device 52 and the through-anchor 53 so as to guide the movement of the belt 51 while in contact with the belt 51 are provided on the back surfaces of the backrests 21b and 22b of the occupant seats 21 and 22—that is, the back surface of the panel 76.

A concave part 101 opening upward and outward is formed in a portion corresponding to the belt 51 at the upper part on both the left and right sides of the panel 76, and the guide ribs 74 and 75 are provided integrally in a projecting manner on the back surface of the panel 76 with spacing therebetween in the extending direction of the belt so as to project from the concave part 101 and to intersect with the extending direction (upward/downward direction) of the belt 51. The guide ribs 74 and 75 may have a length that extends transverse to the extending direction of the belt 51.

In addition, a housing concave part 102 for housing a part of the belt 51 in sliding contact with the side surface facing the panel 76 side of the lower center cross frame 58 is formed in a portion corresponding to the lower center cross frame 58 below the concave part 101.

Further, the through-anchors 53 are disposed in front of an extension line EL extending above the back surfaces of the backrests 21b and 22b—that is, the back surface of the panel 76—and above the uppermost parts 60 of the back surfaces of the backrests 21b and 22b so that straight lines VL connecting the winding device 52 and the through-anchor 53 intersect with the backrests 21b and 22b from a side perspective.

Figure 10:
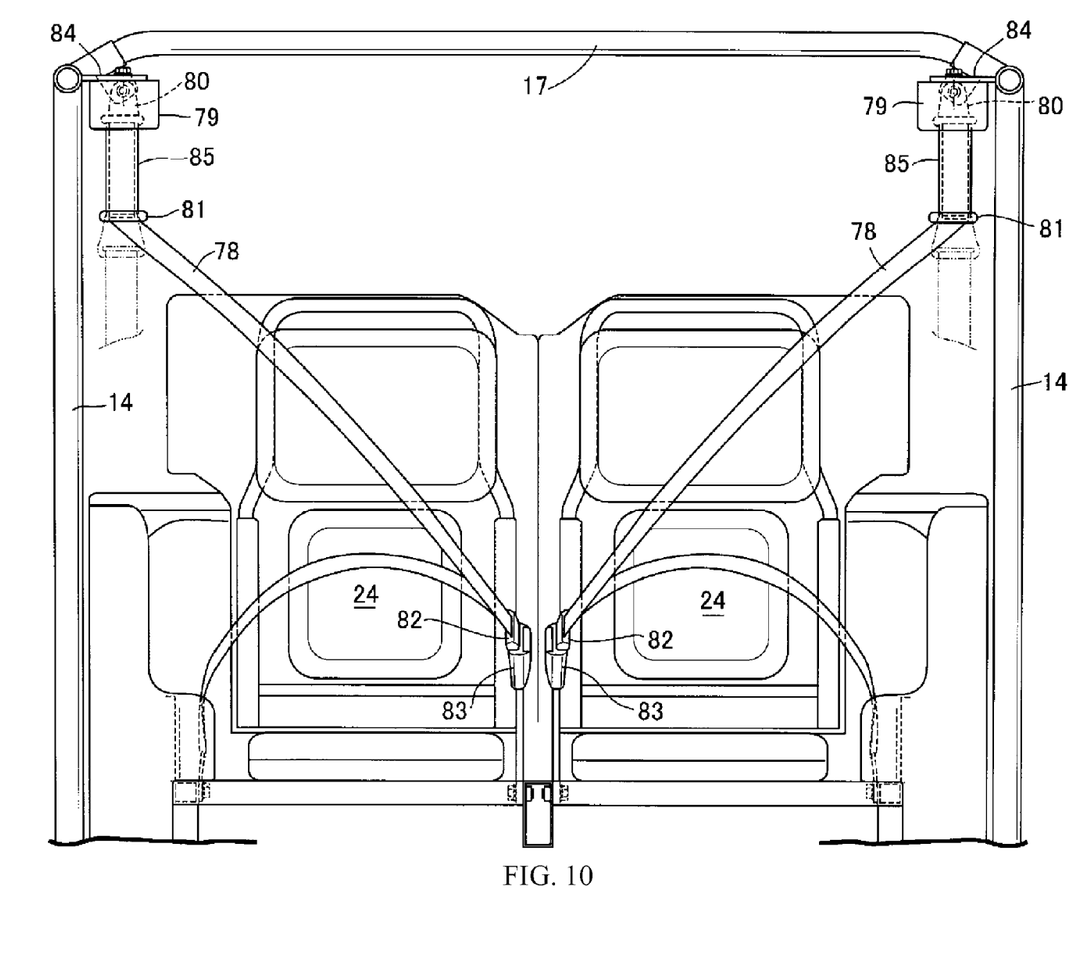
FIG. 10 is a cross-sectional view along line 10-10 in FIG. 1.

In FIG. 10, the rear floor 20 and the pair of left and right rear occupant seats 24 are provided on a rear floor support frame 77. Winding devices 79 of belts 78 for restraining people sitting in the rear occupant seats 24 are supported by stays 84 provided directly in front of the connection parts connecting the upper parts of the rear side frames 14 to the upper rear cross frame 17. In addition, the belts 78 extending from the winding devices 79 are sequentially inserted into upper through-anchors 80 and then lower through-anchors 81 disposed below the upper through-anchors 80, and the tips of the belts 78 are fixed to the rear floor support frame 77 on the outside in the vehicle width direction of the rear occupant seats 24. Further, buckles 83 engaging in a catchable/releasable manner with tongue plate 82 into which the belts 78 are inserted are supported on the rear floor support frame 77 on the inside in the vehicle width direction of the rear passenger seats 24.

The upper through-anchors 80 are attached to the connection parts of the rear side frames 14 and the upper rear cross frame 17, and the lower through-anchors 81 are swingably supported on the lower ends of support plates 85 which are fixed at the upper ends to the connection parts of the rear side frames 14 and the upper rear cross frame 17 and extend downward. When the belts 78 are used, the state illustrated in FIG. 8 is assumed, whereas when the belts are not used, they are suspended downward from the support plates 85 as indicated by the dashed lines in FIG. 10.

With a configuration in which the lower through-anchors 81 into which the belts 78 are inserted are swingably supported on the lower ends of the support plates 85 which are fixed at the upper ends to the connection parts of the rear side frames 14 and the upper rear cross frame 17 in this way, it is possible to improve the operation of the belts 78 and to reduce the load acting on the rear side frames 14 and the upper rear cross frame 17 when the belts 78 are fastened.

Incidentally, a support shaft 88 extending in the vehicle width direction is provided on the rear end of the rear floor support frame 77, and this support shaft 88 is rotatably supported by a pair of left and right brackets 89 (see FIG. 1) provided on the lower part of the rear end of the vehicle body frame F. That is, the rear floor support frame 77 is supported on the rear end of the vehicle body frame F so as to enable rotation between a flip-up position in which the front end thereof is flipped upward and a collapsed position in which the front end is collapsed.

Figure 11:
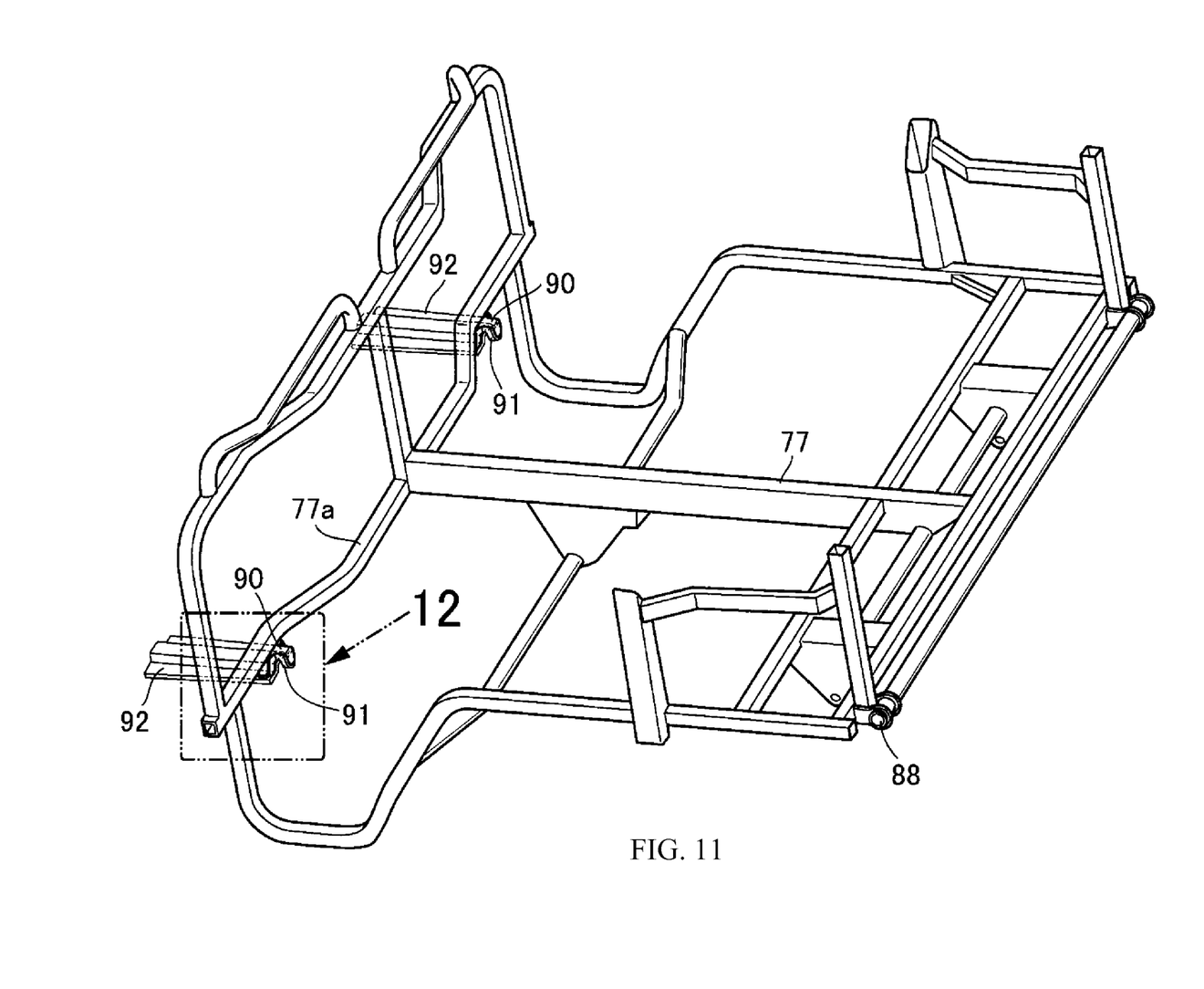
FIG. 11 is a perspective view of a rear floor support frame.

In FIG. 11, a pair of left and right holders 90 are fixed with spacing therebetween in the vehicle width direction to a cross frame part 77a provided on the front end of the rear floor support frame 77 so as to extend in the vehicle width direction, and elastic members 91 made of rubber are held on these holders 90. On the other hand, a pair of left and right regulating members 92, which suppress the rattling of the rear floor support frame 77 in the forward and left/right directions by coming into contact with the elastic members 91 in a state in which the rear floor support frame 77 is in the collapsed position, are provided on the vehicle body frame F side.

Figure 12:
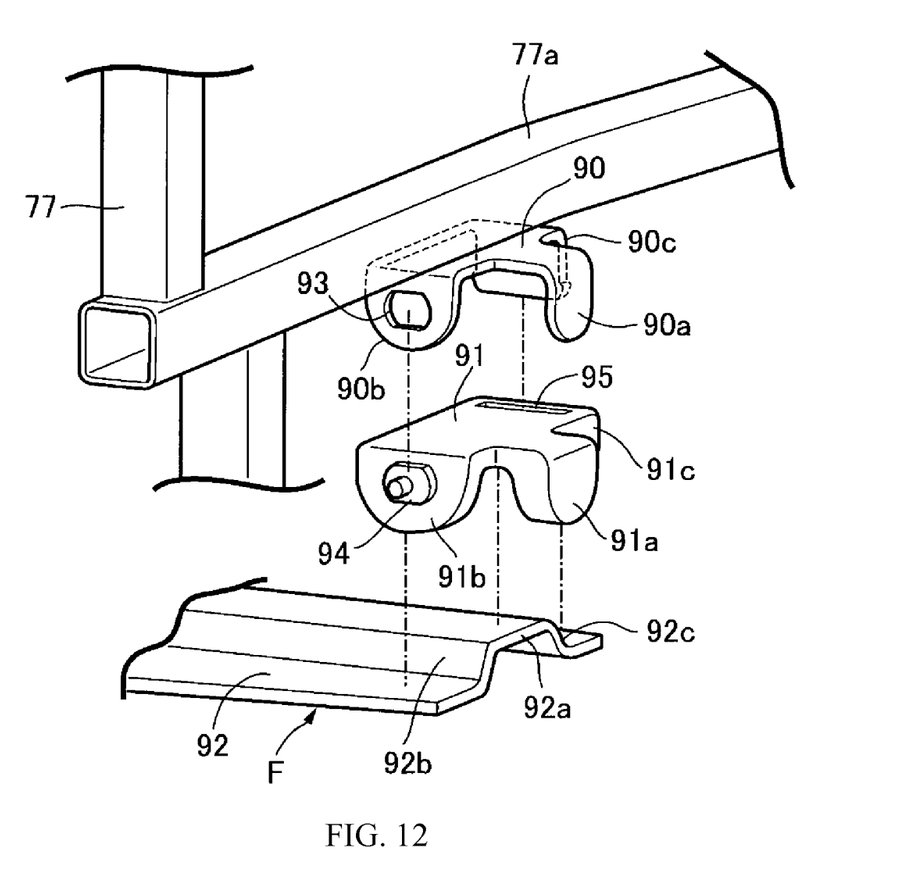
FIG. 12 is an exploded perspective view of the area indicated by arrow 12 in FIG. 11.

In FIG. 12, the holder 90 has a first tab 90a extending downward from the cross frame part 77a behind the cross frame part 77a and second and third tabs 90b and 90c positioned opposite one another with spacing therebetween in the left/right directions below the cross frame part 77a, and an opening part 93 is provided in the second tab 90b.

In addition, the elastic member 91 has a first elastic contact part 91a supported from behind on the first tab 90a of the holder 90, a second elastic contact part 91b supported from the outside in the vehicle width direction on the second tab 90b of the holder 90, and a third elastic contact part 91c supported on the third tab 90c of the holder 90. A fitted projection 94 projecting integrally from the second elastic contact part 91b is fitted into the opening part 93 of the second tab 90b, and an engaging hole 95 for engaging with the third tab 90c is provided in the third elastic contact part 91.

The first elastic contact part 91a of the elastic member 91 can come into contact with the rear end 92a of the regulating member 92 from behind, and contact surfaces 92b and 92c with which the second and third elastic contact parts 91b and 91c of the elastic member 91 are brought into contact are formed on the regulating member 92.

Next, the operation of this embodiment will be described. The winding devices 52 of the belts 51 for restraining people sitting in the occupant seats 21 and 22 are supported on the vehicle body frame F so as to be positioned in back of the seat portions 21a and 22a of the occupant seats 21 and 22 and on the outside in the vehicle width direction, and the through-anchors 53 into which the belts 51 are inserted are supported on the upper parts of the center standing frames 12 positioned on the outside in the vehicle width direction of the occupant seats 21 and 22 and extending upward and downward so as to be positioned above the backrests 21b and 22b of the occupant seats 21 and 22. Therefore, the seat belt devices can be installed regardless of the structure in back of the occupant seats 21 and 22, and an operation of pulling up the belts 51 from behind is unnecessary, as it is only necessary to pull the belts downward from above, so the operation can be improved.

In addition, guide ribs 74 and 75 extending laterally between the winding devices 52 and the through-anchors 53 so as to guide the movement of the belts 51 while in contact with the belts 51 are provided on the back surfaces of the backrests 21b and 22b of the occupant seats 21 and 22, so the movement of the belts 51 is smooth, which makes it possible to reduce the operating load, to reduce the winding force of the winding devices 52, and to enhance the feel during use.

Further, since a plurality (a pair in this embodiment) of guide ribs 74 and 75 with spaces provided therebetween in the extending direction of the belts 51 are provided integrally in a projecting manner on the back surface of the resin panel 76 constituting the back parts of the backrests 21b and 22b so as to intersect with the extending direction of the belts 51, it is possible to increase the ease of assembly and reduce cost when installing the guide ribs 74 and 75 and to make the movement of the belts 51 smooth while reducing the contact area with the belts 51 so as to reduce the operating load.

In addition, since the through-anchors 53 are positioned in front of an extension line EL extending above the back surfaces of the backrests 21b and 22b and above the uppermost parts 60 of the back surfaces of the backrests 21b and 22b so that straight lines VL connecting the winding devices 52 and the through-anchors 53 intersect with the backrests 21b and 22b from a side perspective, it is possible to further improve operation for occupants in the occupant seats 21 and 22 and to prevent slack from occurring in the belts 51 between the through-anchors 53 and the winding devices 52 by reliably bringing the belts 51 into contact with the guide ribs 74 and 75.

Further, since head rests 61 and 62 for each of the occupant seats 21 and 22 are provided independently from the occupant seats 21 and 22 on the headrest attachment member 56 connecting the upper parts of the pair of left and right standing frames 12, and the through-anchors 53 are supported on connection parts connecting the upper parts of the standing frames 12 to the headrest attachment member 56, the operation can be improved by positioning the through-anchors 53 at relatively high positions, and it is possible to reduce the number of parts by eliminating the need to provide specialized frame members for reinforcing the portions supporting the through-anchors 53.

An embodiment of the present disclosure was described above, but the present disclosure is not limited to the embodiment described above, and various design modifications can be made without departing from the present disclosures described in the claims.

What is claimed is:

1. A seat belt assembly for a vehicle in which a pair of left and right occupant seats having seat portions and backrests are provided on a vehicle body frame so that one of the occupant seats is used as a driver's seat and the other is used as a passenger seat, wherein a pair of left and right standing frames constituting a part of the vehicle body frame and extending upward and downward are disposed on the outside of the pair of occupant seats in the vehicle width direction, and the space between the upper ends of the pair of standing frames is connected by a cross frame constituting a part of the vehicle body frame; wherein winding devices of belts for restraining occupants sitting in the occupant seats are supported on the vehicle body frame so as to be positioned behind the seat portions of the occupant seats and on the outside in the vehicle width direction; through-anchors positioned above the backrests of the occupant seats are supported on the upper parts of the standing frames so that the belts are inserted therethrough; and guide ribs between the winding devices and the through-anchors so as to guide the movement of the belts while in contact with the belts are provided on back surfaces of the backrests.

2. The seat belt assembly for a vehicle according to claim 1, wherein the guide ribs are provided integrally in a projecting manner on a back surface of a panel made of a resin constituting a portion of the backrests so as to intersect with an extending direction of the belts with spaces provided therebetween in the extending direction.

3. The seat belt device for a vehicle according to claim 2, wherein the through-anchors are positioned in front of an extension line extending above the back surfaces of the backrests and above uppermost parts of the backrests so that straight lines connecting the winding devices and the through-anchors intersect with the backrests from a side perspective.

4. The seat belt device for a vehicle according to claim 1, wherein a headrest for each of the occupant seats is provided independently from the occupant seats on a headrest attachment member connecting the upper parts of the pair of left and right standing frames, and the through-anchors are supported on connection parts connecting the upper parts of the standing frames to the headrest attachment member.

5. A seat belt assembly for a vehicle comprising:
a seat having a seat portion and a backrest;
a seat belt for restraining an occupant of the seat;
a winding device for winding the belt, the winding device positioned behind the seat portion on an outside of the seat in a width direction of the vehicle;
a through-anchor positioned above the backrest so that the belt extends through the through-anchor; and
at least one guide rib for guiding movement of the belt, the at least one guide rib extending from a back surface of the backrest at a location between the winding device and the through-anchor.

6. The seat belt assembly of claim 5, wherein the at least one guide rib comprises two guide ribs spaced apart in an extending direction of the belt.

7. The seat belt assembly of claim 5, wherein the at least one guide rib is integrally formed with a panel forming the back surface of the backrest.

8. The seat belt assembly of claim 5, wherein the at least one guide rib has a length extending in a direction transverse to an extending direction of the belt.

9. The seat belt assembly of claim 5, further comprising a concave part formed in a panel forming the back surface of the backrest, and wherein the at least one guide rib projects from the concave part.

10. The seat belt assembly of claim 9, further comprising a housing concave part disposed below the concave part for housing a portion of the belt.

11. The seat belt assembly of claim 5, wherein the through-anchor is positioned in front of an extension line extending above the back surface of the backrest and above an uppermost part of the backrest so that a straight line connecting the winding device and the through-anchor intersects with the backrest from a side perspective.

12. The seat belt assembly of claim 5, wherein a headrest for the seat is provided independently from the seats on a headrest attachment member connecting upper parts of a pair of left and right standing frames, and the through-anchor is supported on connection parts connecting the upper parts of the standing frames to the headrest attachment member.

13. A seat belt assembly for a vehicle comprising:
a seat having a seat portion and a backrest;
a seat belt for restraining an occupant of the seat;
a winding device for winding the belt;

a through-anchor positioned above the backrest so that the belt extends from the winding device through the through-anchor; and at least one guide rib for guiding movement of the belt, the at least one guide rib extending from a back surface of the backrest at a location between the winding device and the through-anchor;

wherein the through-anchor is positioned in front of an extension line extending above a back surface of the backrest and above an uppermost part of the backrest so that a straight line connecting the winding device and the through-anchor intersects with the backrest from a side perspective.

14. The seat belt assembly of claim 13, wherein the at least one guide rib comprises a plurality of guide ribs extending from the back surface of the backrest between the winding device and the through-anchor for guiding movement of the belt.

15. The seat belt assembly of claim 14, wherein the backrest comprises a resin panel forming the back surface, and the plurality of guide ribs are integrally formed with the panel.

16. The seat belt assembly of claim 14, wherein the plurality of guide ribs are spaced apart from each other and each have a length extending in a direction transverse to an extending direction of the belt.

17. The seat belt assembly of claim 13, wherein the winding device is positioned behind the seat portion on an outside of the seat in a width direction of the vehicle.

18. The seat belt assembly of claim 13, wherein the through-anchor comprises an upper through-anchor and a lower through-anchor disposed below the upper through-anchor, and the belt passes sequentially from the winding device to the upper through-anchor and then through the lower through-anchor.

19. The seat belt assembly of claim 13, wherein the vehicle has a standing frame extending upward on an outside of the seat, and wherein the through-anchor is configured to be supported on an upper part of the standing frame.

20. The seat belt assembly of claim 13, wherein a headrest for the seat is provided independently from the seat on a headrest attachment member connecting upper parts of a pair of left and right standing frames, and the through-anchor is supported on connection parts connecting the upper parts of the standing frames to the headrest attachment member.

* * * * *